United States Patent [19]

Kupersmit

[11] 4,402,452

[45] Sep. 6, 1983

[54] FOLDABLE REUSABLE SHIPPING CARTON

[76] Inventor: Julius B. Kupersmit, 145-80 228th St., Springfield Gardens, N.Y. 11514

[21] Appl. No.: 396,889

[22] Filed: Jul. 9, 1982

[51] Int. Cl.³ .................... B65D 5/08; B65D 33/16; B65D 43/24

[52] U.S. Cl. .................................. 229/41 R; 229/62; 229/45 R

[58] Field of Search .................... 229/45 R, 47, 41 R, 229/41 B, 53, 55, 62, 65; 150/1.7, 7

[56] References Cited

U.S. PATENT DOCUMENTS

| 875,224 | 12/1907 | Underwood | 229/65 |
| 920,852 | 5/1909 | Flanagan | 150/1.7 |
| 1,537,956 | 5/1925 | McNally | 150/1.7 |
| 1,666,704 | 4/1928 | Hunter | 150/1.7 |
| 2,272,938 | 2/1942 | Feirante | 229/62 |
| 2,329,444 | 9/1943 | Snyder | 229/62 |
| 2,896,839 | 7/1959 | Barnes | 229/62 |

FOREIGN PATENT DOCUMENTS 874205  4/1953  Fed. Rep. of Germany ....... 150/1.7

Primary Examiner—Herbert F. Ross
Attorney, Agent, or Firm—Charles E. Temko

[57] ABSTRACT

A foldable reusable shipping carton having clip-type sealing means which means is used to maintain the carton in folded condition when not in use. When in folded condition, the container is in substantially planar configuration, and so maintained by the same clip which maintains the carton in closed condition after loading.

3 Claims, 7 Drawing Figures

U.S. Patent  Sep. 6, 1983  4,402,452
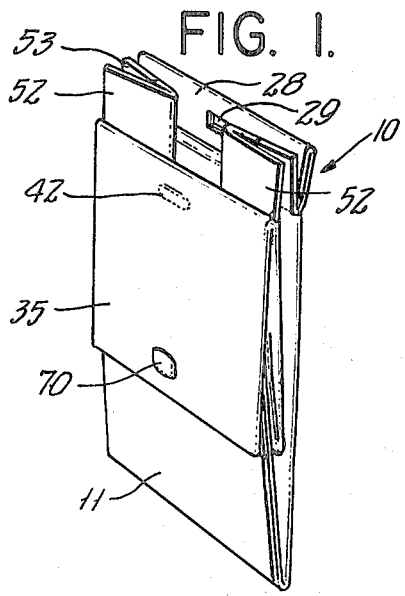
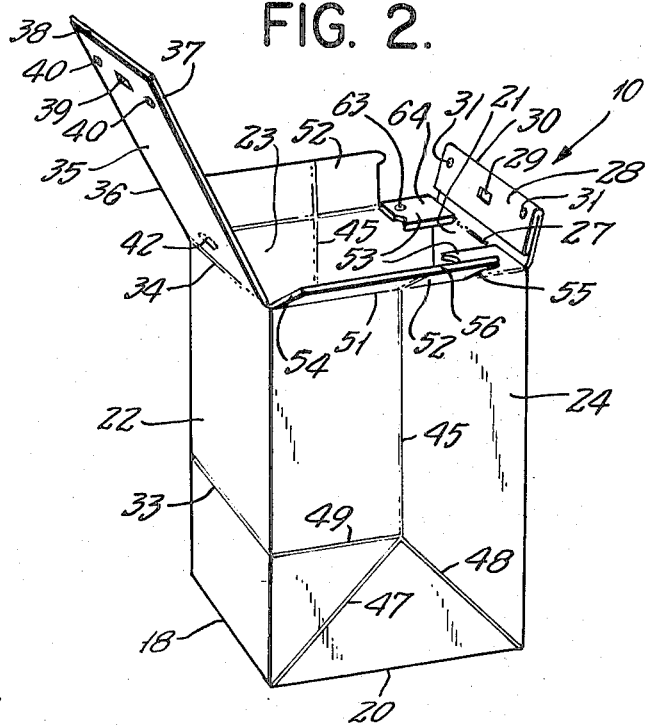
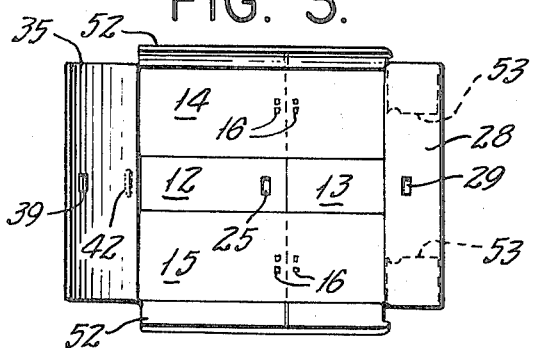
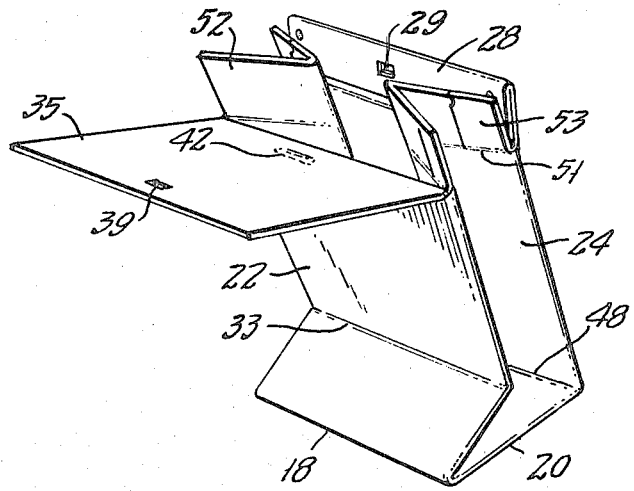
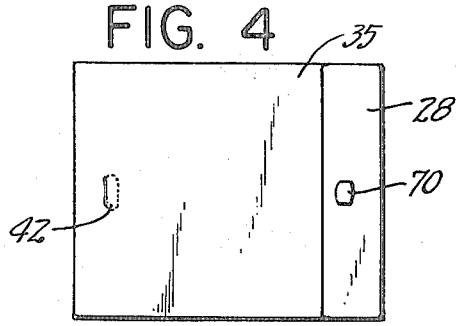
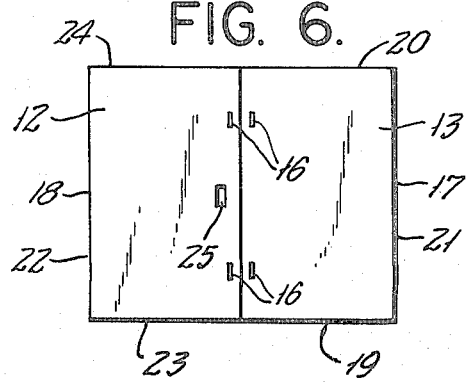
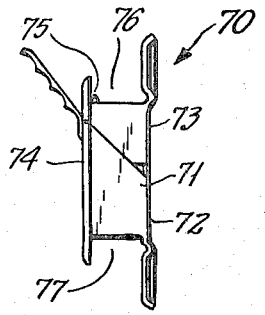

FOLDABLE REUSABLE SHIPPING CARTON

BACKGROUND OF THE INVENTION

This invention relates generally to the field of collapsible reusable shipping cartons or containers, and more particularly to an improved type in which a single sealing or closure means is selectively employable to maintain the carton either in planar condition for storage, or in erected closed condition without resort to other sealing means.

Collapsible reusable shipping containers are well known in the art, in both relatively large and small sizes. For the most part they have been fabricated to include a main body element including a bottom wall and foldably attached side walls, with a separate cover element. When in collapsed condition, the side walls are folded upon the bottom wall, and the cover is then positioned to overlie the folded side walls and bottom wall to form a compact unit. In erected condition, the cover or lid is maintained upon the side walls by frictional retention, or by resort to clip and cleat means. Examples of this type of structure are disclosed in my prior U.S. Pat. Nos. 3,466,710; 3,580,618; and 4,231,149.

In relatively smaller containers, it is desirable to provide a captive lid for the purpose of simplified manufacture, and to provide increased convenience in erected and folded state. Most desirable is the provision in a container of this type of a construction in which the entire container or carton, including the cover, is formed from a single blank of planar fibrous material. Such containers are also known in the art. The principal problem with prior art constructions lies in the relative difficulty in maintaining the container in collapsed condition for storage in truly planar configuration, coupled with the relative difficulty encountered in attempting to rapidly erect the container for use. Another difficulty has been found in maintaining the container in erected condition during loading, where it has a predisposition to collapse along previously scored fold lines.

SUMMARY OF THE INVENTION

Briefly stated, the invention contemplates the provision of an improved reusable shipping container or carton of the class described in which the above mentioned shortcomings have been substantially eliminated. The device includes a relatively rigid base formed by permanently interconnecting overlapping flaps, which remain interconnected during the folding of the container. A large foldably interconnected flap at an opposite end extends over the open enclosure, and cooperates with an oppositely disposed flap, each of the upper flaps having an alignable opening therein for the passage of known clip means which effects a seal. When the container or carton is in collapsed condition, the opening in the larger of the upper flaps is aligned with a corrresponding opening in the base wall by folding it in an opposite direction, so that the same clip may be employed to secure the flap to the bottom wall and thereby maintain the carton in folded planar condition. Separate small flap means are employed to maintain the container in erect condition during the filling or loading thereof to overcome the tendency of the container to return to folded condition.

BRIEF DESCRIPTION OF THE DRAWINGS

In the drawings, to which reference will be made in the specification, similar reference characters have been employed to designate corresponding parts throughout the several views.

FIG. 1 is a view in elevation of an embodiment of the invention showing the device in fully collapsed condition.

FIG. 2 is a perspective view thereof, showing the device in erected condition and ready for loading or unloading.

FIG. 3 is a top plan view thereof as seen from the upper portion of FIG. 2.

FIG. 4 is a top plan view thereof, similar to FIG. 3, but showing certain of the component parts in altered relative position.

FIG. 5 is a perspective view thereof, showing the carton in partially collapsed condition.

FIG. 6 is a bottom plan view thereof, showing the device in erected condition.

FIG. 7 is a side elevational view of a known clip means forming a part of the disclosed embodiment.

DETAILED DESCRIPTION OF THE DISCLOSED EMBODIMENT

In accordance with the invention, the device, generally indicated by reference character 10 is preferably formed from a unitary blank of corrugated cardboard material or the like. It includes a bottom wall 11 formed by interconnecting first, second, third and fourth flaps, 12, 13, 14 and 15, respectively, using staples 16 or gluing (not shown). The flaps 13-15 are interconnected by fold lines 17, 18, 19 and 20 to first and second side walls 21 and 22, and first and second end walls 23 and 24.

The side wall 21 is bounded by an upper fold line 27 to which is attached a double ply relatively narrow flap 28 having aa rectangular opening 29 adjacent a folded edge 30. Hook and pile interconnecting members 31 are provided near the ends of an inner surface 32.

The side wall 22 includes a medially positioned fold line 33 as well as an upper fold line 34 which attaches a relatively large top flap 35 of a size corresponding generally to that of the bottom wall 11. It is bounded by side edges 36 and 37, as well as an end edge 38. A rectangular opening 39 is positioned near the end edge 38, and is adapted to underlie the opening 29 when the box is in closed condition. Corresponding hook and pile members 40 underlie the members 31 in this position. Adjacent the line 34 is an elongated opening 42 forming a handhold for carrying the carton.

The end walls 23 and 24 are symmetrical, each including a vertical fold line 45, angularly disposed fold lines 47 and 48, and a transverse fold line 49. Disposed at an upper fold edge 51 and interconnected therewith is a relatively large flap 52 and a smaller flap 53 (see FIG. 3). The flap 52 is bounded by side edges 54 and 55, and an end edge 56. The flap 53 is bounded by side edges 60 and 61, and an end edge 62. Hook and pile members 63 are positioned on an outer surface 64.

FIG. 9 illustrates a known synthetic resinous clip commonly used in conjunction with fibrous containers to permit the selective interconnection of juxtaposed laminae. It includes a hollow body 71, an inner wall 72 having a fold wall 73, as well as an outer wall 74 incorporating latch means 75. At the ends of the body 71 are transverse recesses 76 and 77 which engage multiple laminae of the container. The clip 70 is described in detail in U.S. Pat. No. 4,019,764, and is one of several clips, any of which can be used for the purposes of the present disclosure.

When the device is in collapsed condition, the end walls 23 and 24 are folded about the lines 45, 47, 48 and 49 to bring the bottom wall 11 into parallel relation with the side wall 22 which folds about the fold line 33. When the flap 35 is folded, the opening 29 therein overlies the rectangular opening 25 in the flap 12, and engagement of the clip 70 through the aligned openings maintains the device in planar storable condition, as shown in FIG. 1. Removal of the clip permits erection of the device 10 to the condition shown in FIG. 2, in which the smaller flaps 53 are folded to horizontal condition thereby maintaining the device in opened condition for loading. Movement of the flap 28 to horizontal condition as shown in FIG. 4 permits interconnection of the corresponding hook and pile members, and prevents movement of the smaller flaps. In this condition, a substantially full opening is provided at the top of the container, and loading or unloading operations can proceed. When the container has been loaded, the flap 28 is lifted to permit the top flap 35 to be moved to closed condition, after the inward folding of the larger flaps 52, the flap 28 may then be again folded to horizontal condition to engage the corresponding hook and pile members. In this position, the openings 29 and 39 are aligned for engagement by the clip 70 to maintain the device 10 in fully closed condition.

It will be apparent that whether the device is being converted from stored condition to usable condition, or from usable condition to stored condition, all of the component parts remain in integral condition, and no tools aare required for either operation. Unlike prior art devices, means is provided for maintaining the carton in erect opened condition for loading or unloading, this means effectively preventing the collapse of the carton to folded condition when such movement is not desired. While such means is in use, the exposed opening may be more than eighty percent of the total normal open area of the conventional box, thus providing substantially no interference with a loading or unloading operation.

I wish it to be understood that I do not consider the invention limited to the precise details of structure shown and set forth in this specification, for obvious modifications will occur to those skilled in the art to which the invention pertains.

I claim:

1. An improved foldable reusable shipping carton comprising a unitary blank of fibrous material interconnected to generally rectangular configuration, and including: a bottom wall formed by a plurality of interconnected overlapping flap members; first and second side walls and first and second end walls extending from said bottom wall, an mutually interconnected to form an enclosure, said end walls and one of said side walls having fold lines therein for collapsing said side walls against said bottom in substantially coplanar condition; one of said side walls having an upper fold edge, and a lid member corresponding in size and configuration to said bottom wall interconnected to said side wall at said fold edge; the other of said side walls having an upper fold edge and a foldable flap attached thereto and adapted to overlie said lid member in closed condition, said last mentioned flap and lid member having aligned openings therein for the reception of an exapandable clip element to maintain said carton in closed erected condition; said bottom wall having a third alignable opening therein, said carton, in folded condition, having said lid member overlying said bottom wall to align the opening therein with said last mentioned opening in said bottom wall for reception of said clip to maintain said folded condition.

2. A container in accordance with claim 1, said end walls having upper fold edges, each of said edges having first and second flaps interconnected to said fold edges, said first flap being adjacent said last mentioned flap cooperating with said lid member to selectively lie therebeneath when said first flaps and said last mentioned flaps are in substantially coplanar relation, said first mentioned flaps on each of said end walls and said last mentioned flaps having cooperative means for selectively retaining said carton in erected open condition for loading.

3. A container in accordance with claim 2, further characterized in said lid member having separable means for selectively retaining said lid member in interconnected relation to said last mentioned flap, independently of said clip element.

* * * * *